(12) United States Patent
Pernikl

(10) Patent No.: US 8,690,199 B2
(45) Date of Patent: Apr. 8, 2014

(54) QUICK CONNECTOR FOR FLUID LINES

(75) Inventor: Norbert Pernikl, Schlüchtern (DE)

(73) Assignee: Veritas AG, Gelnhausen (DE)

( * ) Notice: Subject to any disclaimer, the term of this patent is extended or adjusted under 35 U.S.C. 154(b) by 234 days.

(21) Appl. No.: 13/149,475

(22) Filed: May 31, 2011

(65) Prior Publication Data
US 2011/0291404 A1   Dec. 1, 2011

(30) Foreign Application Priority Data

Jun. 1, 2010 (DE) .......................... 10 2010 022 304

(51) Int. Cl.
F16L 37/00 (2006.01)
(52) U.S. Cl.
USPC .............................. 285/305; 285/81; 285/319
(58) Field of Classification Search
USPC ........... 285/81, 319, 305, 304, 307, 308, 309, 285/310
See application file for complete search history.

(56) References Cited

U.S. PATENT DOCUMENTS

| 3,997,196 A | 12/1976 | Karcher et al. |
| 6,068,303 A * | 5/2000 | Hollnagle .................... 285/319 |
| 7,594,705 B2 | 9/2009 | Rutz et al. |
| 7,874,595 B2 * | 1/2011 | Lechner et al. ............... 285/305 |
| 2006/0066101 A1 * | 3/2006 | Hollnagel ..................... 285/319 |
| 2008/0185911 A1 | 8/2008 | Rutz et al. |
| 2008/0252071 A1 * | 10/2008 | Lechner et al. ............... 285/319 |
| 2011/0095522 A1 * | 4/2011 | Legrand et al. ................. 285/81 |
| 2012/0256414 A1 * | 10/2012 | Ully et al. ..................... 285/319 |

FOREIGN PATENT DOCUMENTS

| CA | 2 554 879 A1 | 1/2008 |
| DE | 20 2005 016 966 U1 | 4/2006 |
| DE | 20 2006 018 697 U1 | 4/2008 |
| WO | WO 2007/042344 A1 | 4/2007 |

OTHER PUBLICATIONS

German Search Report issued on Sep. 14, 2010 (with English language translation of category of cited documents).
The Extended European Search Report dated Jul. 18, 2012, issued in corresponding European Patent Application No. 11002308.2. (6 pages).

* cited by examiner

*Primary Examiner* — Aaron Dunwoody
(74) *Attorney, Agent, or Firm* — Buchanan Ingersoll & Rooney PC

(57) ABSTRACT

The disclosure relates to a quick connector for fluid lines, including: a connecting piece which is adapted to be plugged in a sealing fashion into a receiving opening of a counterpart and to be lockingly engaged, via a latch, with the counterpart, the quick connector having at least one support for supporting the connecting piece on the counterpart such that it is secured against tilting. In order to provide a certain mobility of the quick connector also in the condition of locking engagement, the support can be movable relative to the connecting piece.

17 Claims, 2 Drawing Sheets

Detail X

QUICK CONNECTOR FOR FLUID LINES

The present invention relates to a quick connector for fluid lines, comprising: a connecting piece which is adapted to be plugged in a sealing fashion into a receiving opening of a counterpart and to be lockingly engaged, via latching means, with the counterpart, the quick connector comprising at least one support means for supporting the connecting piece on the counterpart such that it is secured against tilting.

Such a quick connector is known from DE 20 2005 016 966 U1 and WO 2007/042344 A1, respectively. In the case of this solution, the connecting piece is provided with radially projecting support surfaces for providing support against tilting in the receiving opening. According to this solution the connecting piece, when locked to the counterpart, is inevitably secured in position on the counterpart in a tilt-free manner. In order to allow connecting lines to be connected to or released from the quick connector, even in the locked condition, a certain mobility of the quick connector is, however, desirable.

It is the object of the present invention to improve a quick connector of the type indicated at the outset such that, even in the locked condition, a certain mobility of the quick connector is allowed.

The object of the present invention is achieved by a quick connector for fluid lines, comprising a connecting piece which is adapted to be plugged in a sealing fashion into a receiving opening of a counterpart and to be lockingly engaged, via latching means, with the counterpart, the quick connector comprising at least one support means for supporting the connecting piece on the counterpart such that it is secured against tilting, the support means being movable relative to the connecting piece. Making use of the latching means, the quick connector can be pre-mounted on the counterpart. In so doing, the support means is preferably held at a position of non-use at which the connecting piece is movable, and in particular tiltable, relative to the counterpart. Connecting lines can thus be connected to or released from the quick connector more effectively and more easily than in the case of the known solution. Only when the connecting lines have been mounted or demounted as intended, the support means will preferably be transferred to a position of use at which said support means supports the connecting piece on the counterpart such that it is secured against tilting.

The latching means of the quick connector according to the present invention fulfills preferably at least one of the following requirements:

The latching means comprises at least one latching arm which projects from the connecting piece and which extends substantially parallel to the connecting piece axis in a direction opposite to the direction of insertion, said latching arm being resilient in the radial direction.

The latching means comprises preferably two identical latching arms which are arranged on two diametrically opposed sides of the connecting piece.

The latching means, preferably each latching arm, comprises at least one wedge surface facing away from the connecting piece in the direction of insertion and at least one wedge surface facing away from the connecting piece in a direction opposite to the direction of insertion, the wedge surface facing away from the connecting piece in the direction of insertion defining with the axis of the connecting piece an angle that is smaller than the angle defined between said axis of the connecting piece and the wedge surface facing away from the connecting piece in a direction opposite to the direction of insertion, so that the force required for establishing a locking engagement between the latching means and the counterpart is smaller than the force required for releasing said locking engagement. The term wedge surface comprises any surface which is inclined relative to the axis of the connecting piece. Preferably, a wedge surface is configured as a section of the envelope of a cone and/or such that it has a convex curvature.

The latching means can be arranged fully within the receiving opening.

Such a latching means proves to be particularly easy to mount. Due to the fact that the latching means can be arranged fully within the receiving opening, an inadvertent release of the latching means can be excluded to a large extent. In addition, the receiving opening can be closed and/or sealed more easily so as to prevent an ingress of dirt into the receiving opening.

It may prove to be advantageous when the support means is held on the connecting piece such that it is movable along the axis of the connecting piece, preferably such that it is secured against rotation relative to the connecting piece. In an alternative embodiment the support means is held on the connecting piece such that it can be rotated thereon and is secured against displacement. Accidental operation of the support means is thus substantially excluded.

It may prove to be useful when the support means is connected to the connecting piece such that it is captively, preferably non-releasably, secured thereto. The support means can surround the connecting piece in the circumferential direction at least sectionwise, preferably fully. The support means may, however, also comprise cup-shaped components which are adapted to be connected, or which are connected so as to form an annular arrangement around the connecting piece. The support means is e.g. configured such that it has a substantially U-shaped cross-section and that it is adapted to be placed on the connecting piece in locking engagement therewith. The risk that the support means detaches itself unintentionally from the quick connector can be reduced in this way.

It may, however, also be of advantage when the support means is, in at least one position, adapted to be arrested relative to the connecting piece and/or the counterpart, and is preferably adapted to be frictionally and/or positively locked. The support means can thus be prevented from being unintentionally transferred to a different position.

It proved to be particularly useful, when the support means is configured such that it will close the receiving opening, preferably in a sealing fashion. The receiving opening is preferably sealingly closed by the support means, when the support means supports the connecting piece on the counterpart such that it is secured against tilting. It is thus possible to prevent dirt from penetrating into the receiving opening and blocking e.g. the latching arms of the latching means. The support means is preferably configured substantially in the shape of a cover and comprises a circumferentially extending sealing means, which is adapted to be brought into sealing engagement the counterpart.

According to an advantageous embodiment of the present invention, the support means comprises at least one support portion which fulfills at least one of the following requirements:

The support portion is implemented as a flexible tongue.

The support portion is configured such that it is resilient in the radial direction to the axis of the connecting piece.

The support portion is adapted to be frictionally and/or positively engaged with the connecting piece and/or the counterpart, preferably in a locking fashion.

The support portion extends substantially parallel to the axis of the connecting piece, preferably in the direction of insertion.

The support portion comprises a sliding surface which faces the connecting piece and which is preferably in sliding engagement with said connecting piece, said sliding surface having preferably an inner contour that is adapted to the outer contour of the connecting piece.

The support portion comprises a support surface which faces away from the connecting piece and which is preferably configured as a cylinder jacket section, said support surface having an outer contour that is adapted to the inner contour of the receiving opening.

The support portion comprises a wedge surface which faces away from the connecting piece in the direction of insertion, said wedge surface defining preferably an acute angle with the axis of the connecting piece and being preferably configured as a section of the envelope of a cone.

The support portion comprises a locking means which is adapted to be brought into locking engagement with the counterpart, preferably a locking projection extending radially beyond the support surface, said locking means comprising preferably at least one wedge surface facing away from the connecting piece in the direction of insertion and at least one wedge surface facing away from the connecting piece in the direction opposite to the direction of insertion, the wedge surface facing away from the connecting piece in the direction of insertion defining a smaller angle with the axis of the connecting piece than the wedge surface facing away from the connecting piece in the direction opposite to the direction of insertion, so that the force required for establishing a locking engagement between the locking means and the counterpart is smaller than the force required for releasing the locking engagement.

The support portion comprises a stop which radially projects beyond the support surface and which limits the insertion depth of the support portion in the receiving opening of the counterpart.

According to a particularly advantageous embodiment of the present invention, the support means comprises at least two support portions which fulfil at least one of the following requirements:

The support portions are arranged at regular intervals around the circumference of the connecting piece.

The support portions are arranged around the axis of the connecting piece in a rotationally symmetric mode of arrangement.

The support portions are arranged on two diametrically opposed sides of the connecting piece.

The support portions are arranged between the latching arms.

The support portions have an identical structural design.

According to a preferred embodiment of the present invention, the quick connector is provided with a safety means, which is adapted to be transferred between a safety position, at which the locking engagement between the latching means and the counterpart is secured against release, and a release position, at which the locking engagement can be released. The safety means fulfills preferably at least one of the following requirements:

At the safety position, the safety means blocks a release movement of the latching means, preferably a radially inwards directed release movement of a latching arm of the latching means.

At the release position, the safety means allows a release movement of the latching means, preferably a radially inwards directed release movement of a latching arm of the latching means.

The safety means is held on the connecting piece such that it is axially movable thereon.

The safety means is held on the connecting piece such that it is secured against rotation relative thereto.

The safety means is adapted to be arrested in at least one position relative to the connecting piece and/or the counterpart, and is preferably adapted to be frictionally and/or positively locked.

The safety means is arrested on the connecting piece and/or the counterpart at the safety position and/or the release position, and is preferably frictionally and/or positively locked.

The safety means is arranged such that it can be displaced along the connecting piece.

The safety means is captively connected to the quick connector, preferably captively connected to the connecting piece.

The safety means is non-releasably connected to the quick connector, preferably non-releasably connected to the connecting piece.

The safety means circumferentially surrounds the connecting piece, at least sectionwise, preferably fully.

The safety means consists of substantially cup-shaped components which are connected so as to form an annular arrangement around the connecting piece.

The safety means is configured such that it has a substantially U-shaped cross-section and is adapted to be placed on the connecting piece in locking engagement therewith.

The safety means is adapted to be moved together with the support means relative to the connecting piece.

It may be of advantage when the support means is adapted to be moved together with the safety means relative to the connecting piece, the support means supporting the connecting piece on the counterpart preferably such that it is secured against tilting, when the safety means occupies the safety position.

It may be of advantage when the support means is preferably fixedly connected to the safety means, preferably such that one piece is defined, or formed integrally with said safety means. Preferably, the safety means and the support means define, in common, a slide which is movable relative to the connecting piece. This has the effect that the safety means and the support means can be operated much more easily.

The object of the present invention is also achieved by a connection device comprising a quick connector for fluid lines and a connection counterpart with a receiving opening, said quick connector comprising: a connecting piece which is adapted to be plugged in a sealing fashion into a receiving opening of a counterpart and to be lockingly engaged, via latching means, with the counterpart, the quick connector comprising at least one support means for supporting the connecting piece on the counterpart such that it is secured against tilting, the support means being movable relative to the connecting piece. The connection device according to the present invention offers the above-mentioned advantages.

It may of advantage that, when the latching means is in locking engagement with the counterpart, the support means is adapted to be transferred between a position of use, at which the support means supports the connecting piece on the counterpart such that it is secured against tilting, and a position of non-use, at which the connecting piece is adapted to be tilted relative to the counterpart.

It may, however, also be of advantage to implement the support means such that, when it occupies the position of use, it is, at least in certain sections thereof, arranged in the receiving opening between the connecting piece and the counterpart and/or that it is arranged outside the receiving opening when it occupies the position of non-use.

It may prove to be useful to implement the support means such that, at least when occupying one of its positions, it is adapted to be arrested relative to the connecting piece and/or the counterpart, and is preferably adapted to be locked by frictional and/or positive engagement, the support means being preferably locked on the counterpart when it occupies its position of use.

It may be useful to implement the support means such that, when occupying its position of use, it bridges a distance between the connecting piece and the counterpart in the radial direction, preferably on diametrically opposed sides of the connecting piece, without any gaps being formed.

It may be specially useful to implement the support means such that it closes the receiving opening preferably in a sealing fashion. In this way, the receiving opening can be prevented from getting dirty and blocking e.g. the latching means.

Preferred embodiments of the present invention result from combinations of the features specified in the claims or in the description.

DETAILED DESCRIPTION OF THE PREFERRED EMBODIMENT

Figure 1:
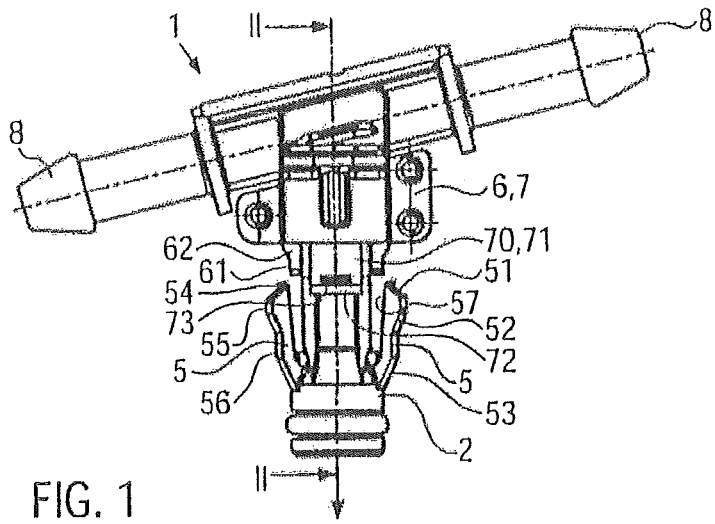
FIG. 1 shows a front view of the quick connector according to the present invention, in which the safety means is at the release position and the support means is at the position of non-use.

The preferred embodiment and the use of the invention will be explained hereinbelow in detail with reference to the drawings.

The invention relates to a plug-in quick connector 1 used for fluid lines and configured as a leak oil plug. The quick connector 1 according to the present invention comprises a one-piece, substantially T-shaped body made of glass fibre reinforced plastic material (e.g. PA66+6 GF30 and polyamide 66+6 with 30% glass fibre) and comprising a connecting piece 2 and an upper part which extends transversely to said connecting piece 2. The connecting piece 2 is adapted to be plugged in a sealing fashion into the receiving opening 3 of a counterpart 4. Within the connecting piece 2 a branch line extends to the line extending between two conical connection members 8 in the upper part of the body. The line axis of the branch line, which will also be referred to as axis of the connecting piece 2 hereinbelow, defines with the axis of the line between the connection members 8 an angle of approx. 75°. Leak oil lines or connection lines to be connected are attachable to the connection members 8. In the direction of insertion of the quick connector 1, which is indicated by the arrow in FIG. 1, a sealing ring is held in a circumferentially extending groove on a cylindrical end of the connecting piece 2. Above the cylindrical end piece of the connecting piece 2, grooves 21, 22 are formed on the connecting piece 2.

The latching means comprises two identically implemented, resilient latching arms 5 which project from the connecting piece 2 on diametrically opposed sides of the connecting piece axis in a direction opposite to the direction of insertion and which are adapted to be lockingly engaged with the counterpart 4. Each latching arm 5 is provided with a wedge surface 51 which is formed essentially at the free end of the latching arm 5 adjacent the largest radius of the latching arm 5 and which faces away from the connecting piece 2 in a direction opposite to the direction of insertion. The wedge surface 51 extends at an angle of approximately 45° to the connecting piece axis. A stop 54 is formed directly at the free end of the latching arm 5. In addition, each latching arm 5 has on its outer side two wedge surfaces 52, 53 facing away from the connecting piece 2 in the direction of insertion, the wedge surface 52 being formed adjacent the largest radius of the latching arm 5 and the wedge surface 53 being formed immediately adjacent the cylindrical part of the connecting piece 2. The wedge surfaces 52, 53 each extend at an angle of approx. 20° to the axis of the connecting piece 2. In view of the different angles of inclination of the wedge surfaces 51 and 52 relative to the connecting piece axis, the force required for plugging the connecting piece 2 in is larger than the force required for pulling it out. The wedge surfaces 51, 52 and 53 have provided between them sliding surfaces 55 and 56 which extend substantially parallel to the connecting piece axis, the sliding surface 55 defining the largest radius of the latching arm 5. An inner surface 57 of the latching arm 5 facing the connecting piece 2 is configured as a wedge surface, said wedge surface being continuously inclined relative to the connecting piece axis from the base point to the end of the latching arm 5, preferably at an angle of approx. 10°.

The safety means 6 and the support means 7 are formed integrally with one another in the present embodiment and define a slide which is slidable along the axis of the connecting piece 2 and which is supported on said connecting piece 2 such that it is secured against rotation relative thereto. The slide comprises two substantially cup-shaped components which annularly enclose the connecting piece 2 so that the slide is captively supported on the connecting piece 2. For mounting the cup-shaped components, welding cams provided on one of the components are passed through complementary welding cam openings provided in the other component, and are then welded together so as to connect the two components positively and by a substance-to-substance bond. By displacing the slide on the connecting piece 2 in the direction of insertion or in a direction opposite to the direction of insertion, the safety means 6 is adapted to be moved between a release position, at which the locking engagement of the quick connector 1 is releasable, and a safety position, at which the locking engagement is guaranteed. Simultaneously, the support means 7 is adapted to be moved, by displacing the slide on the connecting piece 2, between a position of non-use, at which the connecting piece 2 can be tilted relative to the counterpart 4, and a position of use, at which the support means 7 supports the connecting piece 2 on the counterpart 4 such that it is secured against tilting. A projection on the inner side of the slide defines the latching means, which is complementary to the grooves 21, 22, so as to hold the slide in locking engagement with the connecting piece 2, when the safety means 6 preferably occupies the release position and/or the safety position and when the support means 7 occupies the position of non-use and/or the position of use. The fact that the safety means 6 and the support means 7 are formed integrally with one another offers the advantage that both said devices can be operated in common. The safety means 6 and the support means 7 may, however, also be implemented as functionally separate, independent devices.

The safety means 6 comprises two identical wedge portions 61 which are arranged on opposed sides of the connecting piece 2 in correspondence with the respective positions of the latching arms 5 and which project from the slide substantially parallel to the axis of the connecting piece 2 in the direction of insertion. At the release position, the safety means 6 is not in engagement with the latching arms 5 so that the latching arms 5 can be displaced radially inwards. When the safety means 6 is transferred from the release position to the safety position, the safety means 6 cooperates via a wedge-type engagement with the latching arms 5 such that said latching arms 5 will symmetrically be spread from the connecting piece 2 to an increasing extent. Also at the safety position, the latching arms 5 are spread from the connecting piece 2. The safety means 6 has on each wedge portion 61a wedge surface 62 which faces away from the connecting piece 2 in the direction of insertion and which is in wedge-type engagement with the latching arm 5 at the safety position. This wedge surface 62 does not have a constant inclination relative to the axis of the connecting piece 2, but the degree of inclination increases from an end of the wedge portion 61 constituting the leading end when seen in the direction of insertion, in a direction opposite to said direction of insertion. This has the effect that the wedge portion 61, i.e. the wedge surface 62 is concave in shape, i.e. it has a curvature, the radius of said curvature being between 1.0 mm and 15.0 mm, preferably between 2.0 mm and 10.0 mm, preferably approx. 5.0 mm. It is thus possible to achieve, with increasing insertion depth of the wedge portion 61 into the gap between the latching arms 5 and the connecting piece 2, an increasing degree of spread per insertion depth.

The support means 7 comprises two identical support portions 70 arranged on opposite sides of the connecting piece 2 between the wedge portions 61 of the safety means 6 and between the latching arms 5, respectively, and projecting from the slide substantially parallel to the axis of the connecting piece 2 in the direction of insertion. On the side facing the connecting piece 2 each support portion 70 comprises a sliding surface, which is in sliding engagement with the connecting piece 2 and which has an inner contour that is adapted to the outer contour of the connecting piece 2. Each support portion 70 comprises a convex support surface 71 which is implemented as a cylinder jacket section and which faces away from the connecting piece 2 and has an outer contour that is adapted to the inner contour of the receiving opening 3. The radius of the support surface 71 or the distance of the support surface 71 to the axis of the connecting piece 2 is at least as large as the narrowest cross-section of the receiving opening 3 in the area of the undercut 41. This has the effect that the support surface 71 abuts on the narrowest cross-section of the receiving opening 3 under preload, when the support means 7 is at its position of use and when the support portion 70 is arranged within the receiving opening 3. At the end of the support portion 70 constituting the leading end in the direction of insertion, the support surface 71 is followed by a wedge surface 72 which faces away from the connecting piece 2 in the direction of insertion. The support surface 71 has formed thereon a bead-shaped locking projection 73 projecting outwards radially to the connecting piece axis beyond the support surface 71. The locking projection 73 can be formed integrally with the support portion 70 or it may subsequently be formed on the latter making use of an elastic material. By means of the locking projection 73 the support portion 70 is lockingly secured in position on the counterpart 4 when it has overcome the narrowest cross-section of the receiving opening 3.

The support portions 70 of the support means 7 can be connected to the wedge portions 61 of the safety means 6 so as to define a ring that encloses the connecting piece 2. Furthermore, the safety means 6 and/or the support means 7 may be configured for closing the receiving opening 3, preferably in a sealing manner. The receiving opening 3 is, preferably sealingly, closed when the safety means 6 is at the safety position and/or when the support means 7 is at the position of use.

The quick connector 1 may additionally comprise an indicator device which indicates the position occupied by the slide. This indicator device is preferably a coloured mark which is covered by the slide and thus not visible at a first position and which is exposed and, consequently, visible at a second position.

Figure 2:
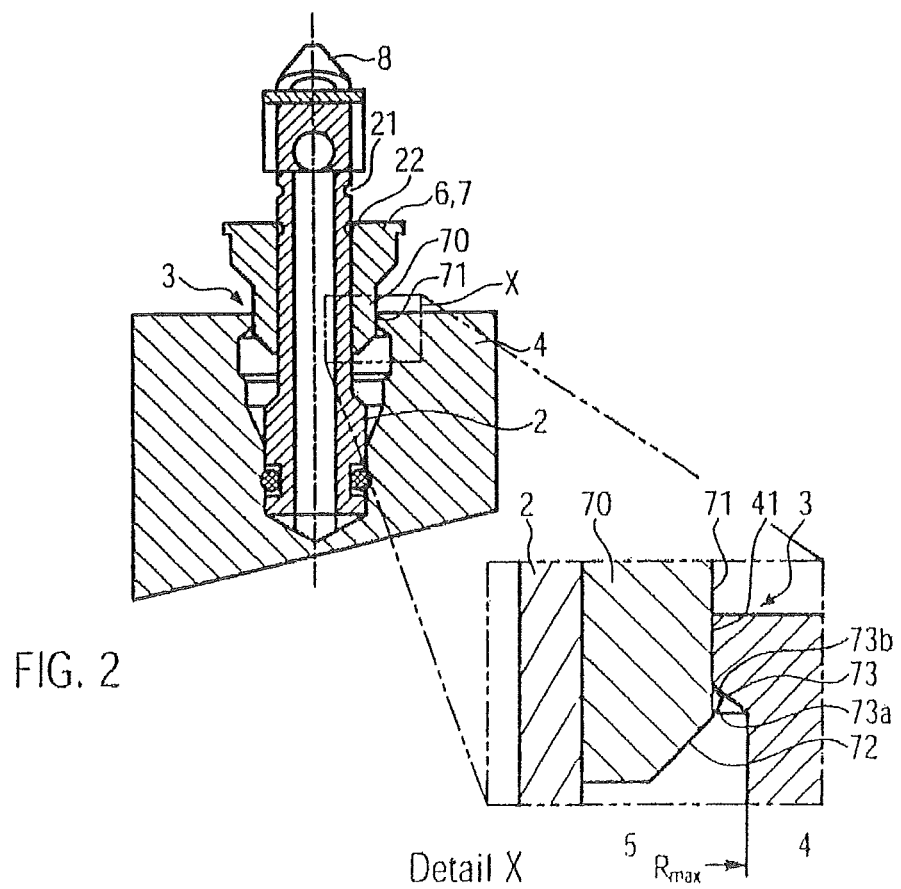
FIG. 2 shows a sectional view of the quick connector according to the present invention along line II-II of FIG. 1 in a sectional view of the connection device according to the present invention, the support means being at the position of use and bridging a gap between the connecting piece and the counterpart without any gaps being formed, so that the connecting piece is supported on the counterpart such that it is secured against tilting.

FIG. 2 shows a sectional view of the quick connector 1 according to the present invention in accordance with FIG. 1 in locking engagement with the counterpart 4, the safety means 6 being at the safety position and the support means 7 being at the position of use. For identical components the same reference numerals as in FIG. 1 will be used, and a renewed description is dispensed with. It can be seen that the support portions 70 are, sectionwise, accommodated in the receiving opening 3 so that, in the sectional view shown, they bridge the distance between the connecting piece 2 and the counterpart 4 in a radial direction on diametrically opposed sides of the connecting piece 2 without any gaps being formed, and clamp the connecting piece 2. A detail X shows the condition of engagement between the support means 7 and the counterpart 4. The geometry of the support portion 70 and, in particular, the geometry of the locking projection 73 are of such a nature that the force required for insertion into the receiving opening 3 is smaller than the force required for removal from the receiving opening 3, an effect which is accomplished by wedge surfaces 73a, 73b facing away from the connecting piece 2 in the direction of insertion and opposite to the direction of insertion, the wedge surface 73a facing away from the connecting piece 2 in the direction of insertion defining preferably a smaller, i.e. more acute angle with the axis of the connecting piece 2 than the wedge surface 73b facing away from the connecting piece 2 in a direction opposite to the direction of insertion.

The preferred use of the present invention is described hereinbelow in more detail with reference to the drawings.

The quick connector 1 according to the present invention is plugged into the receiving opening 3 of the counterpart 4 in the direction of insertion, the slide being, in its upper position, locked in the groove 21 on the connecting piece 2. The safety means 6 is now at the release position and the support means 7 at the position of non-use. During the insertion process, the connecting piece 2 is first centered in the receiving opening 3 via the latching-arm wedge surfaces 52, 53 facing away from the connecting piece 2 in the direction of insertion. When no force is applied in the direction of insertion (plug-in force), the wedge surfaces 52 facing away from the connecting piece 2 in the direction of insertion abut on the undercut 41. By applying a plug-in force, the latching arms 5 cooperate with the undercut 41 by a wedge-type engagement so that they are displaced radially inwards so as to slide with the sliding surface 55 over the undercut 41. Due to the resilient characteristics of the latching arms 5, said latching arms 5 return to a position at which they project from the connecting piece 2 so that they lockingly engage behind the undercut 41. The wedge surfaces 51 facing away from the connecting piece 2 in a direction opposite to the direction of insertion come into engagement with the undercut 41, the stop 54 being located between the cylindrical part of the connecting piece 2 and the undercut 41 in the radial direction. The quick connector 1 is now in locking engagement with the counterpart 4.

The slide is now displaced on the connecting piece 2 in the direction of insertion from the upper position to the lower position. In the course of this movement the safety means 6 is transferred from the release position to the safety position and, simultaneously, the support means 7 is transferred from the position of non-use to the position of use. When the safety means 6 is being transferred from the release position to the safety position, the wedge surfaces 62 of the wedge portions 61 cooperate via a wedge-type engagement with the latching arms 5 such that, as the insertion depth increases, the latching arms 5 are symmetrically spread from the connecting piece 2 to an increasing extent and pushed deeper into the receiving opening 3 via a wedge-type engagement with the undercut 41.

Simultaneously with the transfer of the safety means 6 from the release position to the safety position, the support means 7 is transferred from the position of non-use to the position of use. In the course of this movement, the wedge surface 72 of the support portion 70 is introduced in the receiving opening 3 in the direction of insertion so that the connecting piece 2 is centered within said receiving opening 3 and the axis of the connecting piece 2 coincides with the axis of the receiving opening 3. When the slide is now advanced still further into the receiving opening 3 in the direction of insertion, the locking projection 73 will come into contact with the narrowest cross-section of the receiving opening 3, with the wedge surface 73a facing away from the connecting piece 2 in the direction of insertion first. This has the effect that the locking projection 73 is forced radially inwards until the slide can be passed through the narrowest cross-section of the receiving opening 3. After having overcome the narrowest cross-section of the receiving opening 3, the locking projection 73 reassumes its original shape due to the resilient resetting forces, so that the support means 7 will be in locking engagement with the counterpart 4. In this condition, the connecting piece 2 is clamped between the support portions 70 and the receiving opening 3 is sealingly closed by the slide or the safety means 6 and/or the support means 7. At the lower position of the slide, the projection on the inner side of the slide engages the groove 22 so that the slide is in locking engagement with the connecting piece 2 and is locked in position thereon.

By displacing the slide on the connecting piece 2 in a direction opposite to the direction of insertion from the lower to the upper position, the safety means 6 can be retransferred from the safety position to the release position and the support means 7 can be retransferred from the position of use to the position of non-use. At the release position, the safety means 6 is not in engagement with the latching arms 5 so that said latching arms 5 can be displaced radially inwards. At the position of non-use, the support means 7 is not in engagement with the counterpart 4 so that, in the locked condition, the connecting piece 2 can be tilted relative to the counterpart 4. By applying a force in a direction opposite to the direction of insertion (pull-out force), the quick connector 1 can be pulled out of the receiving opening 3. At the release position of the safety means 6 and the position of non-use of the support means 7, the projection on the inner side of the slide engages the groove 21 so that the slide is in locking engagement with the connecting piece 2 and locked thereon, respectively. The safety means 6 and the support means 7 are thus reversibly transferrable between the release position and the safety position and between the position of use and the position of non-use, respectively.

Figure 3:
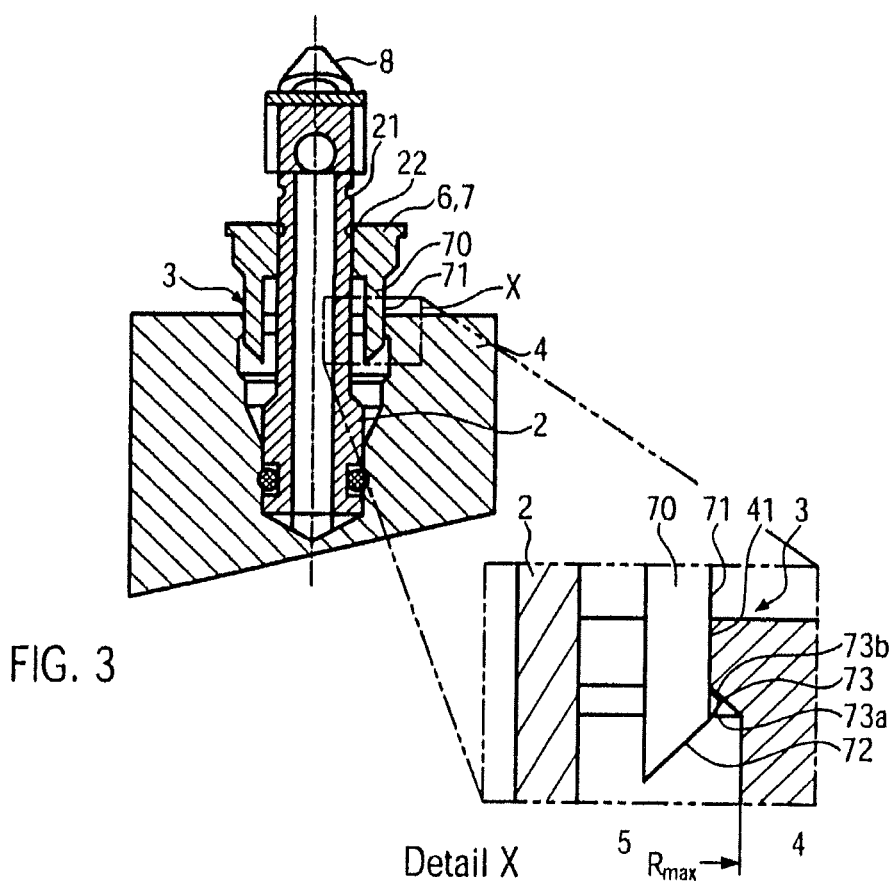
FIG. 3 shows an alternative embodiment of the quick connector according to the present invention and of the connection device according to the present invention in accordance with FIG. 2.

An alternative embodiment of the invention is shown in FIG. 3. For identical components the same reference numerals as in FIGS. 1 and 2 will be used, and a renewed description is dispensed with. A detail X shows the condition of engagement between the support means 7 and the counterpart 4. Deviating from the embodiment according to FIG. 2, the support portions 70 are implemented as flexible tongues projecting in the direction of insertion. The support portions 70 implemented as flexible tongues are here deflected radially inwards when they overcome the narrowest cross-section of the receiving opening 3, and they reassume their original shape when they have overcome said narrowest cross-section of the receiving opening 3, so that the support means 7 is locked in position on the counterpart 4.

The invention claimed is:

1. A connection device, comprising a quick connector for fluid lines and a connection counterpart with a receiving opening, said quick connector comprising:
a connecting piece for plugging in a sealing fashion into a receiving opening of a counterpart and for lockingly engaging, via latching means, with the counterpart; and
at least one support means for supporting the connecting piece on the counterpart such that the connecting piece is secured against tilting, wherein the support means is movable relative to the connecting piece, and
when the latching means is in locking engagement with the counterpart, the support means is adapted to be transferable between a position of use, at which the support means supports the connecting piece on the counterpart such that it is secured against tilting, and a position of non-use, at which the connecting piece is adapted to be tiltable relative to the counterpart, and
when occupying its position of use, the support means bridges a distance between the connecting piece and the counterpart in a radial direction without any gaps being formed.

2. A connection device according to claim 1, wherein the support means is held on the connecting piece such that it is movable along an axis of the connecting piece.

3. A connection device according to claim 1, wherein the support means is connected to the connecting piece such that it is captively secured thereto.

4. A connection device according to claim 1, wherein the support means is, in at least one position, adapted to be arrested relative to at least one of the connecting piece and the counterpart.

5. A connection device according to claim 1, wherein the support means is configured such that it will close the receiving opening.

6. A connection device according to claim 1, wherein the support means comprises at least one support portion which fulfills at least one of the following requirements:
  a. the support portion is implemented as a flexible tongue;
  b. the support portion is configured such that it is resilient in a radial direction;
  c. the support portion is adapted to be frictionally and/or positively engaged with the connecting piece and/or the counterpart;
  d. the support portion extends substantially parallel to an axis of the connecting piece;

e. the support portion comprises a sliding surface which faces the connecting piece and which is in sliding engagement with said connecting piece, said sliding surface having an inner contour that is adapted to an outer contour of the connecting piece;
f. the support portion comprises a support surface which faces away from the connecting piece;
g. the support portion comprises a wedge surface which faces away from the connecting piece in a direction of insertion, said wedge surface being configured as a section of a cone;
h. the support portion comprises a locking means which is adapted to be brought into locking engagement with the counterpart, said locking means comprising at least one wedge surface facing away from the connecting piece in a direction of insertion and at least one wedge surface facing away from the connecting piece in a direction opposite to the direction of insertion, the wedge surface facing away from the connecting piece in the direction of insertion defining a smaller angle with an axis of the connecting piece than the wedge surface facing away from the connecting piece in a direction opposite to the direction of insertion, so that a force required for establishing a locking engagement between the locking means and a counterpart will be smaller than a force required for releasing the locking engagement; and
i. the support portion comprises a stop which radially projects beyond the support surface and which limits an insertion depth of the support portion in a receiving opening of the counterpart.

7. A connection device according to claim 1, wherein the support means comprises at least two support portions which fulfill at least one of the following requirements:
  a. the support portions are arranged at regular intervals around a circumference of the connecting piece;
  b. the support portions are arranged around an axis of the connecting piece in a rotationally symmetric mode of arrangement;
  c. the support portions are arranged on two diametrically opposed sides of the connecting piece;
  d. the support portions are arranged between latching arms of the latching means; and
  e. the support portions have an identical structural design.

8. A connection device according to claim 1, wherein the quick connector is provided with a safety means, which is adapted to be transferred between a safety position, at which a locking engagement between the latching means and a counterpart will be secured against release, and a release position, at which the locking engagement can be released.

9. A connection device according to claim 8, wherein the support means is fixedly connected to the safety means, such that one piece is defined, or formed integrally with said safety means.

10. A connection device according to claim 1, wherein, when occupying the position of use, the support means is, at least sectionwise, arranged in the receiving opening between the connecting piece and the counterpart and/or that it is arranged outside the receiving opening when it occupies the position of non-use.

11. A connection device according to claim 1, wherein, at least when occupying one of its positions, the support means is adapted to be arrested relative to the counterpart, and is to be locked by frictional and/or positive engagement, the support means being locked on the counterpart when it occupies its position of use.

12. A connection device according to claim 1, wherein the support means is configured such that, at least when occupying its position of use, it closes the receiving opening.

13. A connection device according to claim 2, wherein the support means is connected to the connecting piece such that it is captively, non-releasably, secured thereto.

14. A connection device according to claim 13, wherein the support means is, in at least one position, adapted to be arrested relative to at least one of the connecting piece and the counterpart, and is adapted to be at least one of frictionally and positively locked.

15. A connection device according to claim 14, wherein the support means is configured such that it will close the receiving opening, in a sealing fashion.

16. A connection device according to claim 15, wherein the support means comprises at least one support portion which fulfills at least one of the following requirements:
  a. the support portion is implemented as a flexible tongue;
  b. the support portion is configured such that it is resilient in a radial direction;
  c. the support portion is adapted to be at least one of frictionally and positively engaged with at least one of the connecting piece and the counterpart;
  d. the support portion extends substantially parallel to an axis of the connecting piece;
  e. the support portion comprises a sliding surface which faces the connecting piece and which is in sliding engagement with said connecting piece, said sliding surface having an inner contour that is adapted to an outer contour of the connecting piece;
  f. the support portion comprises a support surface which faces away from the connecting piece;
  g. the support portion comprises a wedge surface which faces away from the connecting piece in a direction of insertion, said wedge surface being configured as a section of a cone;
  h. the support portion comprises a locking means which is adapted to be brought into locking engagement with the counterpart, said locking means comprising at least one wedge surface facing away from the connecting piece in a direction of insertion and at least one wedge surface facing away from the connecting piece in a direction opposite to the direction of insertion, the wedge surface facing away from the connecting piece in the direction of insertion defining a smaller angle with an axis of the connecting piece than the wedge surface facing away from the connecting piece in a direction opposite to the direction of insertion, so that a force required for establishing a locking engagement between the locking means and a counterpart will be smaller than a force required for releasing the locking engagement; and
  i. the support portion comprises a stop which radially projects beyond the support surface and which limits an insertion depth of the support portion in a receiving opening of the counterpart.

17. A connection device according to claim 15, wherein the support means comprises at least two support portions which fulfill at least one of the following requirements:
  a. the support portions are arranged at regular intervals around a circumference of the connecting piece;
  b. the support portions are arranged around an axis of the connecting piece in a rotationally symmetric mode of arrangement;
  c. the support portions are arranged on two diametrically opposed sides of the connecting piece;
  d. the support portions are arranged between latching arms of the latching means; and
  e. the support portions have an identical structural design.

* * * * *